April 16, 1968     D. W. HAMM ET AL     3,377,682
METHOD FOR STRETCHING SEPARATED PISTON RINGS
Filed Oct. 21, 1965     6 Sheets-Sheet 1
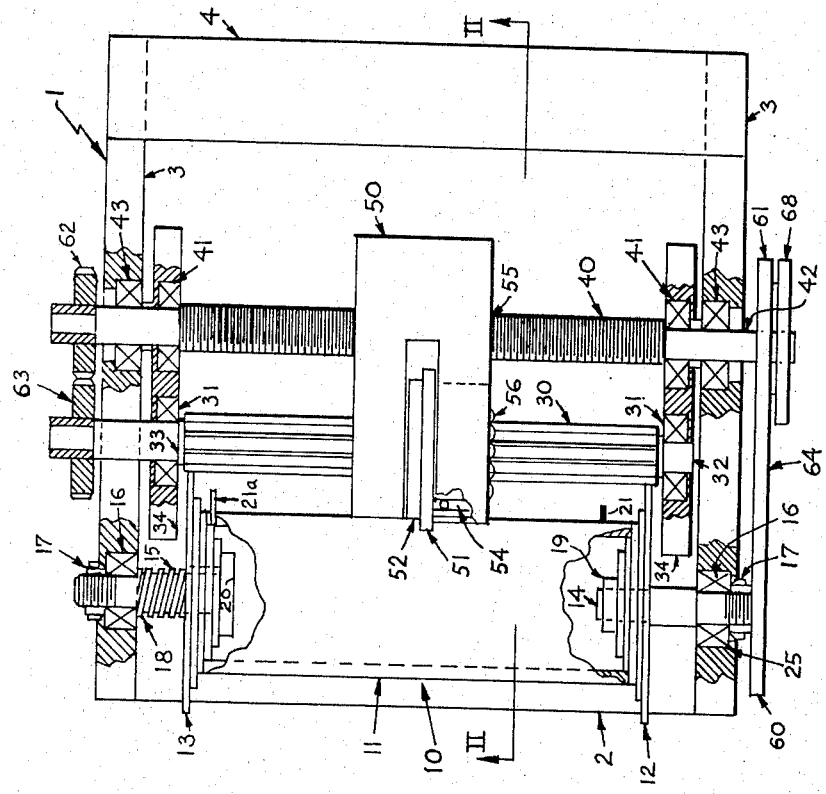
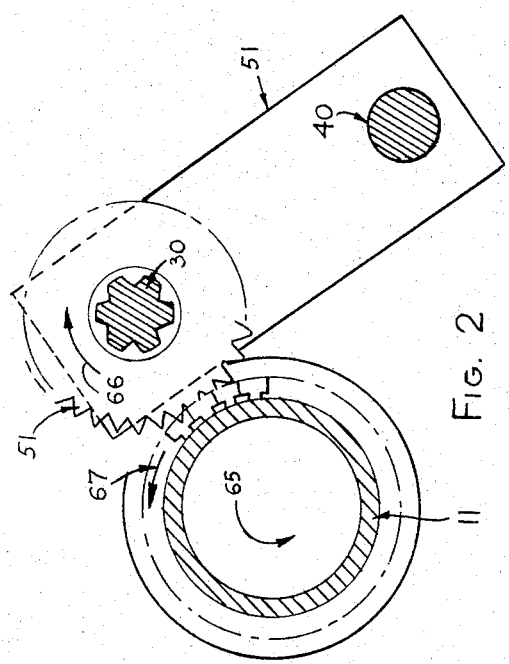
INVENTORS
DOUGLAS W. HAMM
KENNETH J. NISPER
BY ALDEN V. HARDICK
ATTORNEYS April 16, 1968   D. W. HAMM ET AL   3,377,682
METHOD FOR STRETCHING SEPARATED PISTON RINGS
Filed Oct. 21, 1965   6 Sheets-Sheet 2

INVENTORS
DOUGLAS W. HAMM
KENNETH J. NISPER
ALDEN V. HARDICK
BY
*Chico & Keneveld*
ATTORNEYS April 16, 1968   D. W. HAMM ET AL   3,377,682
METHOD FOR STRETCHING SEPARATED PISTON RINGS
Filed Oct. 21, 1965   6 Sheets-Sheet 3

INVENTORS
DOUGLAS W. HAMM
KENNETH J. NISPER
BY ALDEN V. HARDICK

ATTORNEYS

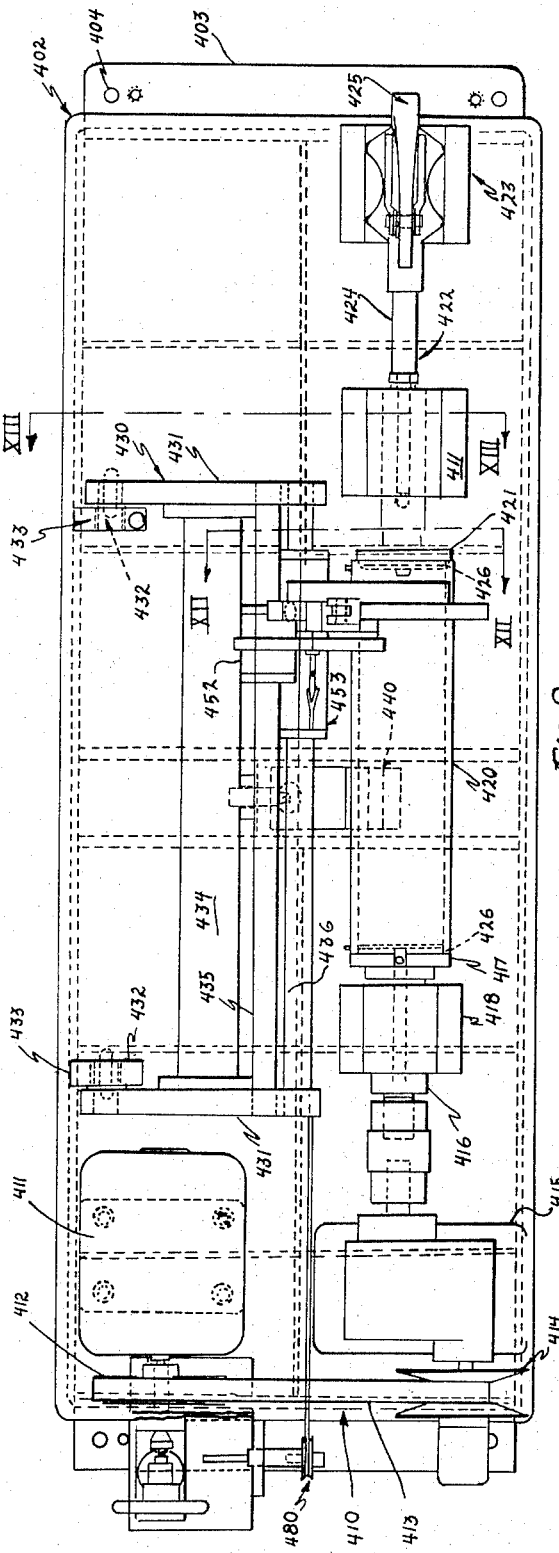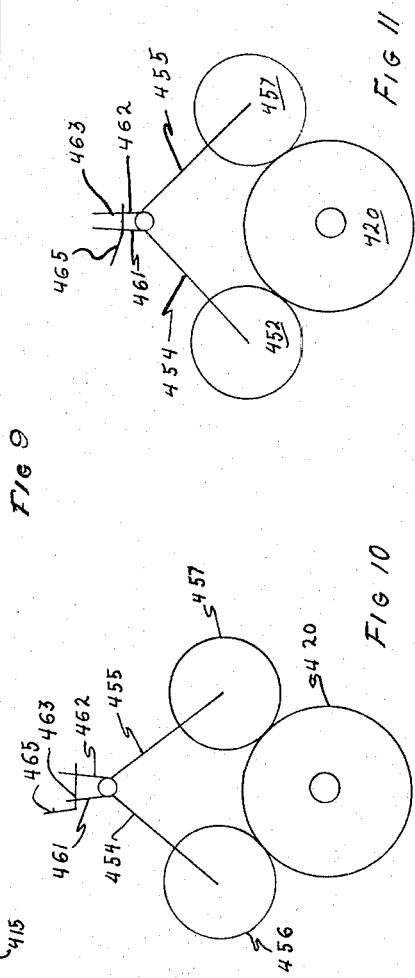

April 16, 1968 D. W. HAMM ET AL 3,377,682

METHOD FOR STRETCHING SEPARATED PISTON RINGS

Filed Oct. 21, 1965 6 Sheets-Sheet 5

INVENTORS
DOUGLAS W. HAMM
KENNETH J. NISPER
BY ALDEN V. HARDICK

Price & Heneveld

ATTORNEYS

April 16, 1968     D. W. HAMM ET AL     3,377,682
METHOD FOR STRETCHING SEPARATED PISTON RINGS
Filed Oct. 21, 1965     6 Sheets-Sheet 6

INVENTORS
DOUGLAS W. HAMM
KENNETH J. NISPER
BY ALDEN V. HARDICK

*Price & Heneveld*

ATTORNEYS

United States Patent Office 3,377,682
Patented Apr. 16, 1968

3,377,682
METHOD FOR STRETCHING SEPARATED PISTON RINGS
Douglas W. Hamm, Muskegon, Kenneth J. Nisper, Spring Lake, and Alden V. Hardick, Muskegon County, Mich., assignors to Muskegon Piston Ring Company, Muskegon, Mich., a corporation of Michigan
Filed Oct. 21, 1965, Ser. No. 500,056
9 Claims. (Cl. 29—156.6)

This invention relates to methods of manufacturing piston rings of the so called "cracked type," and, more particularly, to methods of circumferentially stretching the piston ring stock after its segments have been "cracked" or separated.

Circumferentially compressible piston rings of this type are fabricated from a continuous ribbon of material which is blanked, bent to the desired cross-sectional shape, and coiled before dividing or separating the consecutive series of segmental sections. A heat treatable material is provided with laterally extending slots arranged at a predetermined spacing along the strip. Score lines are impressed into it at the ends of each or selected ones of the slots. These score lines may be terminated a short distance from the edge of the strip which is to form the circumferential margin of the finished product in accordance with the teachings of application No. 361,297, filed Apr. 20, 1964 now Patent No. 3,241,219, issued Mar. 22, 1966, and entitled Method of Making Piston Rings and application No. 361,026, filed Apr. 20, 1964, now Patent No. 3,193,285, issued July 6, 1965, entitled Piston Rings. The strip is shaped, coiled, and heat treated to a brittle hardness. The scraper portion of the rings are then separated into segments at desired score lines by subjecting the area of the score lines to circumferential tension in excess of the ultimate tensile strength of the material, producing a controlled rupture. The ring material is then circumferentially stretched to provide a gap of desired width between the successive ring segments such that, when installed, the segment faces will be resiliently forced by an outward tension force into abutting and conforming relationship with the cylinder wall. The stretching process also imparts radial tension to the finished piston ring which insures its ability to conform to minor imperfections in the cylinder wall.

It is an object of this invention to provide methods whereby piston rings of this type may be circumferentially stretched to the desired segment gap width.

More specifically, it is an object of this invention to provide methods and apparatus for performing this operation which effect the required stretching without introducing irregularities or discontinuities in the scraper surface of the piston ring material.

It is a further object of this invention to provide methods of performing the above outlined stretching operations which are extremely accurate, and yet, capable of mechanized execution.

These and other objects of this invention will be clearly understood by reference to the following specification and accompanying drawings in which:

FIG. 1 is a partially broken plan view of a first embodiment of this invention;

FIG. 2 is a cross-sectional view along line II—II of FIG. 1;

FIG. 9 is a plan view of a fourth embodiment of this invention;

FIGS. 10 and 11 are diagrammatical views showing the operational characteristics of the spreading gear carriers shown in FIG. 9;

Briefly, the first embodiment of this invention comprises a cylindrically shaped receiving sleeve which rotates at a specified peripheral speed. Means are provided on the sleeve for securing the end portions of a coil of blanked and shaped piston ring stock to be stretched. The coil of stock is initially disposed about the sleeve and one end thereof affixed to the sleeve. A tension sprocket rotating at a slower peripheral speed than the receiving sleeve engages the straps of the coil of stock to be stretched. The peripheral speed differential of these two components effects a stretching of the ring stock. Means are provided whereby the tension sprocket traverses the length of the receiving sleeve at the rate of one ring width per one revolution of the sleeve.

According to a second embodiment of this invention, the coil of ring stock to be stretched is disposed about the periphery of an expandable cylindrical mandrel. The ends of the coiled stock are suitably secured to the periphery of the mandrel. The mandrel is then expanded to stretch the ring stock to the desired degree and, while held in stretched condition, the coil is heat treated to set the stretch.

According to a third embodiment of this invention, the coil of stock to be stretched is initially disposed about a cylindrical surface having a diameter which is larger than the diameter of the relaxed piston ring to be produced therefrom. This operation stretches the ring material along its inside diameter. The cylinder and ring material are then heat treated to set the inside diameter stretch. After heat treating, the coil of stock is wrapped about a cylindrical surface having a diameter smaller than the diameter of the relaxed ring stock. This operation stretches the ring stock along its outside diameter. The cylinder and ring stock are then again heat treated to set the outside diameter stretch.

According to the teachings of a fourth embodiment of this invention the coil of ring stock to be stretched is helically disposed about a cylinder with one end affixed thereto. The cylinder is rotatably mounted on a suitable framework. A pair of separating or spreading gears are brought into engaging relationship with the outside diameter of the ring stock adjacent its secured end. The spreading gears are indexed by a third gear such that they must always rotate at identical peripheral speeds. Means are provided for increasing the circumferential distance between the points at which the spreading gears contact the helically disposed stock such that the stock is stretched or spread between the gears. The cylinder is then rotated such that all of the stock passes under the spreading gears. The other end of the stock is then secured to the cylinder and cylinder is subjected to heat treatment to set the stretch in the piston ring stock.

Figure 14:
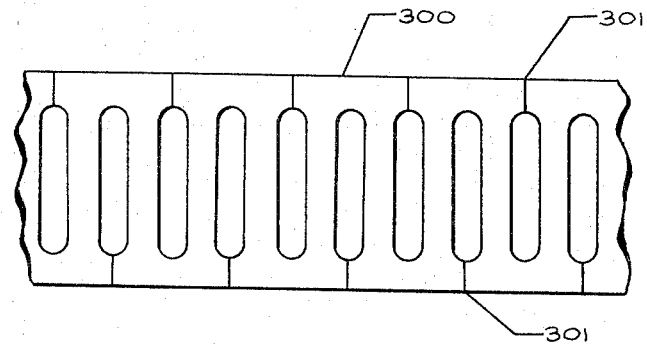
FIG. 14 is a plan view of the ribbon-like blank before it is shaped.
Figure 15:
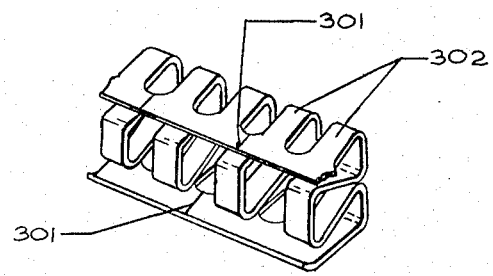
FIG. 15 is a cross-sectional view of one type of piston ring stock to which the teachings of this invention pertain.
Figure 16:
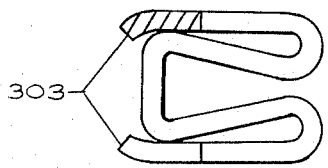
FIG. 16 is a perspective view of the piston ring stock to which the teachings of this invention pertain.

Referring initially to FIGS. 14 through 16 there is shown in FIG. 14 one type of ribbon-like blank 300 from which the piston ring stock may be formed. The score lines indicated by reference numeral 301 are impressed into the blank at this stage of the fabrication procedure. In FIGS. 15 and 16 the piston ring stock has been formed from the blank by a shaping process. Reference numeral 302 indicates the straps of the ring stock while reference numeral 303 indicates the scraper faces.

FIGS. 14 through 16 are shown only as an aid to understanding the methods and machines which form the subject of this disclosure. The scope of this invention is not to be limited by the particular configuration of the piston ring stock shown in these figures. For example, the score lines 301 may be differently spaced and the ribbon-like blank may be punched in a different manner.

Referring now to FIGS. 1–2 the first embodiment of this invention will be discussed in detail. The frame 1, consisting of base bars 2, side plates 3, and a top bar 4, supports the apparatus. Affixed to frame 1 is a mandrel assembly indicated generally at 10. The mandrel assembly has a cylindrically shaped receiving sleeve 11 abutted at each end by sleeve retainer plates 12 and 13. Some means (not shown) such as mating notches must be provided for locking the sleeve to plate 12. Preferably, as shown, sleeve retainer plates 12 and 13 are shaped so as to accommodate singly a plurality of cylinders of varying diameters. It is for this reason that the plates 12 and 13 each have a plurality of concentric shoulders. The sleeve retainer plates 12 and 13 are affixed respectively to shafts 14 and 15 by plate retainer 19 and the plate retainer 20. The mandrel shaft extremities are journaled in side plate 3 by suitable bearing means 16 and fastening means 17.

A sleeve retainer spring 18 is disposed about shaft 15 between side plate 3 and sleeve retainer plate 13. Sleeve retainer spring 18 allows the sleeve retainer plate 13 to be slid into and out of engagement with the receiving sleeve 11 so that the receiving sleeve may be removed from the apparatus. The shaft 14 has a shoulder 25 to take the end thrust of the spring 18. Some means are provided on the periphery of the receiving sleeve for securing the end portions of the ring material to the sleeve. These means may take the form of radially projecting pins 21 and 21a. The ring stock to be stretched is placed over these pins in such a manner that the pins pass between the stock and between the two scraper faces.

A splined shaft 30 having a stud portion on each end is mounted on rocker arms 34 by suitable bearings 31. As shown best in FIG. 1, the right hand end 33 of shaft 31 is extended to mount gear 63 exteriorly of the side frame 3. The rocker arms 34 are pivotally mounted by bearings 41 on the threaded drive shaft 42 as shown in FIG. 1. The drive shaft 42, in turn, is rotatably mounted on side plates 3 by suitable bearings 43. The right hand end of this shaft also has a gear receiving section extending beyond side support 3.

A tension sprocket carrier 50 has one end engaging the threaded drive shaft 42. As is well known in the machine tool art, the tension sprocket carrier 50 incorporates an internally threaded aperture 55 engaging the thread 40 on the drive shaft 42. This engagement must permit such release so that the carrier can be returned to its starting position. This can be accomplished by means of a half-socket or a quick release clamping means, such as are well known in the machine tool art. As shaft 42 is rotated, tension sprocket carrier 50 traverses the length of the thread 40 at a speed determined by the thread pitch and the speed that shaft 42 is rotated.

The end of the carrier 50 is equipped with a bearing 54 rotatably mounting tension sprocket 52. The hub 52 of the tension sprocket has means 56 engaging the splined shaft so that the hub and sprocket rotate with shaft 30 and can travel slidably along it (see FIG. 2).

The external extremity of mandrel shaft 14 is provided with sprocket 60. A chain connects sprocket 60 to a sprocket 61 on the end of the threaded shaft 42. Although not shown, a prime mover is connected to a shaft 42 by means of a sprocket 68. The right hand extremities of threaded shaft 42 and splined shaft 33 have a positive drive connection consisting of the two meshed gears 62 and 63. The relative diameters of the two gears determines the relative rotational speeds of the two shafts.

In operation, the coil of stock to be stretched is slipped over one end of the sleeve and one end of it is anchored to the sleeve by sealing it over the pin 21. The tension sprocket carrier 50 is swung into the position shown in FIG. 2 with the teeth of the tension sprocket 51 in mesh with the straps of the stock. If necessary, some locking means may be provided to secure the tension sprocket carrier from pivoting away from the sleeve. Engagement with the stock is made adjacent pin 21 which secures the end of the stock to the sleeve.

The prime mover is then actuated and sprocket 60 begins to rotate at a given speed. Sprocket 60 transmits rotational motion to receiving sleeve 11 and to threaded drive 61. The rotation of the threaded shaft is transmitted to splined shaft 30 by the gears 62 and 63. The relative directions of rotation of the sleeve and tension sprocket are indicated by arrows 65 and 66 in FIG. 2. Arrow 67 indicates the direction of movement of the piston ring stock.

As previously noted, the sizes of gears 62 and 63, the diameter of the receiving sleeve 11, the relative sizes of sprockets 60 and 61, and the pitch of thrust drive 40 are so correlated that the peripheral speed of receiving sleeve 11 exceeds the peripheral speed of tension sprocket 51 by an amount equal to the desired increase in length or stretch to be imparted to the coil of stock. The tension sprocket carrier 50 longitudinally traverses the length of the receiving sleeve at the rate of one ring width per sleeve revolution. This results in a sequential stretching of the coil of piston ring stock along its entire length.

When receiving sleeve 11 has been completely stretched, the end of the ring stock is secured to the periphery by the pin 21a. The tension sprocket is swung away from receiving sleeve 11 which then is removed from the machine by depressing sleeve retainer plate 13 against sleeve retainer spring 18. Another receiving sleeve having a coil of unstretched ring stock disposed on it is then placed on the machine, the tension sprocket carrier 50 is returned to the other end of worm gear 40, and the stretching process is repeated. The receiving sleeve 11 with the ring stock coiled helically thereabout, is heat treated at a prescribed temperature for a prescribed time. In this manner the stretch is set into the ring stock. For carbon steel rings 30–60 minutes at 600° F. is generally satisfactory for this purpose.

Figure 3:
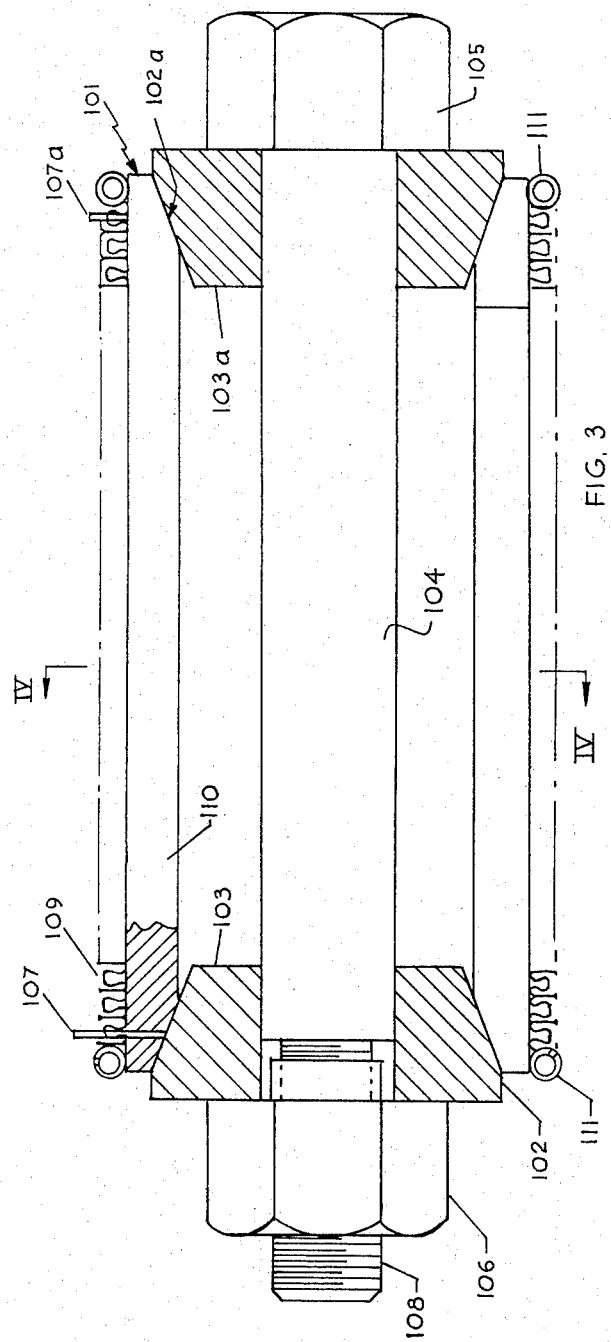
FIG. 3 is a front-elevational view in partial cross section of the apparatus of a second embodiment of this invention.
Figure 4:
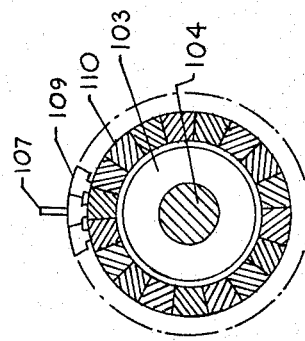
FIG. 4 is a cross-sectional view along line IV—IV of FIG. 3.

Referring now to FIGS. 3 and 4 which show an expandable mandrel assembly, a second embodiment of this invention will be discussed in detail. The assembly comprises an expandable slotted sleeve 101 consisting of a plurality of bars 110 (FIG. 4) each having frustro-conical internal end sections 102. In the contracted condition of the sleeve 101, the bars 110 form a solid surface of circular cross section. A pair of matching frustro-conical plugs 103, and 103a are received by the expandable sleeve. The frustro-conical plugs 103 and 103a have apertures at their centers through which an arbor having a shoulder 105 is placed. A nut 106 mates with the threaded end 108 of the arbor. The bars 110 are secured to the plugs by means of circular springs 111.

In operation, the mandrel assembly is initially set to have a diameter approximately equal to that of the coil of stock to be stretched. The coil of stock is slid over the sleeve and its ends are secured to the sleeve periphery by pins 107 and 107a. The stretching process is then effected by tightening nut 106. This forces the frustro-conical shaped plugs 103 and 103a toward each other. The closing of these plugs increases the diameter of the expandable slotted sleeve by separating the bars 110, thus stretching the ring material the desired amount. The mandrel assembly with the ring material disposed about it is then heat treated to set the stretch. For carbon steel ring material 30–60 minutes at approximately 600° F. is satisfactory for this purpose.

Figure 5:
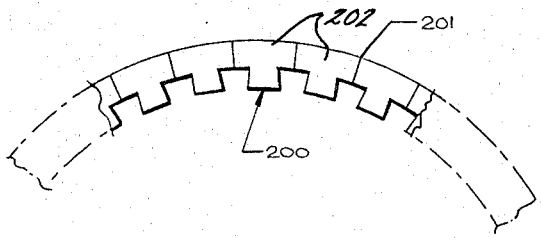
FIGS. 5–8 show a method and apparatus which comprises a third embodiment of this invention.
Figure 6:
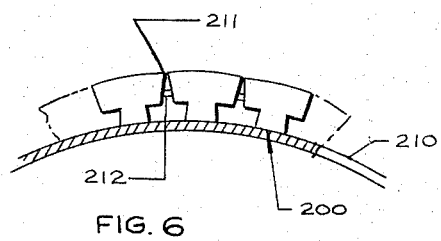

Referring now to FIGS. 5–8 a third embodiment of this invention will be discussed in detail. FIG. 5 shows a sector of a piston ring coil 200 prior to stretching. Note the regularity of the ruptures 201 between segments 202 and the relative proximity of the segments. In FIG. 6 the coil of piston ring material 200 has been disposed about a cylindrical sleeve 210 in helical fashion. The outside diameter of cylindrical sleeve 210 is larger than the inside diameter of the relaxed piston ring coil shown in FIG. 5. The effect of this disposition is to widen the segment gap 212 at the inside diameter of the piston ring coil. After the coil 200 has been helically wrapped about cylinder 210 to capacity, the cylinder is heat treated to set the stretch 212 at the inside diameter of the piston ring coil. For carbon steel rings a period of 30–60 minutes at approximately 600° F. is satisfactory.

Figure 7:
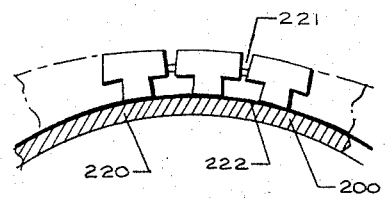

After this heat treating, the piston ring stock coil is removed from cylinder 210 and again tightly disposed in helical fashion about another cylinder 220 as shown in FIG. 7. The outside diameter of cylinder 220 is less than the inside diameter of the piston stock after its removal from sleeve 210. The effect of this disposition is to widen the segment gap 221 at the outside diameter of the coil of piston ring stock. The piston ring stock is secured at each end to the cylinder and the entire assembly is heat treated to set the stretch 221 at the outside segment diameter.

Figure 8:
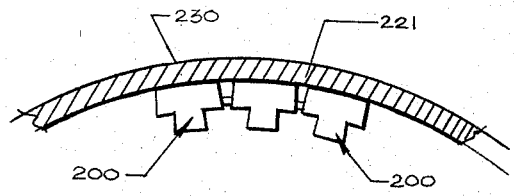

FIG. 8 is similar to FIG. 7 except that instead of being disposed about the outside of a cylinder of relatively small diameter 220, the piston ring stock is helically disposed on the inside of a cylinder whose inside diameter is less than the outside diameter of the relaxed coil of piston ring stock. Again the effect of this disposition is to widen the outsider diameter segment gap 221. As in FIG. 7, the entire assembly is subjected to an increased temperature which sets the stretch in the ring stock.

The relative diameters of the cylinders 210, 220, and 230 are determined by the initial diameter of the relaxed coil of ring stock, and the amount of stretch that it is desired to impart to the piston ring stock. These factors, of course, must be correlated to some extent with the heat treat temperature and the length of time that the assembly is allowed to remain in heat treat.

Figure 12:
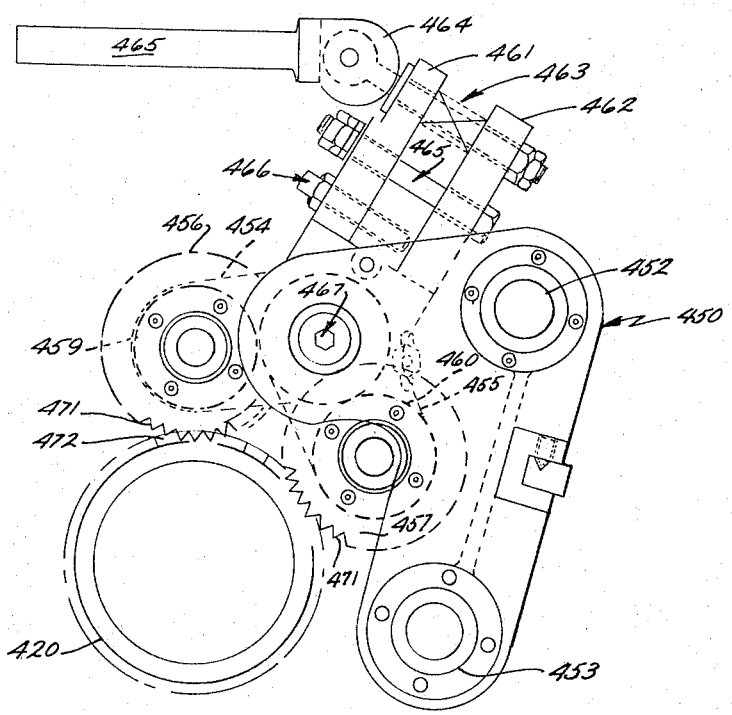
FIG. 12 is a sectional view taken along line XII—XII of FIG. 9.
Figure 13:
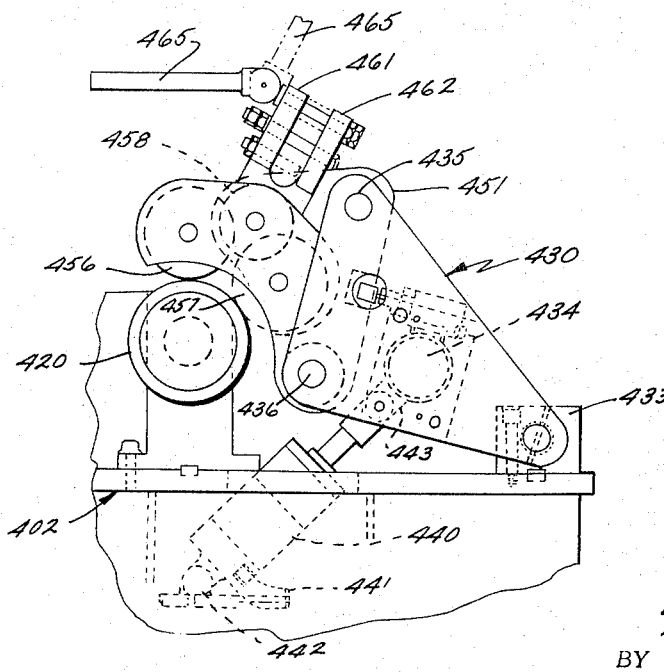
FIG. 13 is a sectional view taken along line XIII—XIII of FIG. 9.

Referring now to FIGS. 9 through 13 a fourth embodiment of this invention will be discussed in detail. FIGS. 9, 12 and 13 shown an upstanding support frame 402 having base flanges 403 with suitable anchoring apertures 404. Supported on and within support frame 402 is a drive assembly 410 comprising a motor 411 with a conventional V-belt pulley 412. A V-belt 413 transmits rotational thrust from motor 411 to a suitably mounted gear reduction box 415 via pulley 414. A stretching cylinder butt plate 417 is rotatably connected to gear reduction box 415 by means of suitable conventional linkage 416.

A second stretching cylinder butt plate 421 is suspended through suitable conventional linkage 422 in longitudinally spaced relationship to butt plate 417. Linkages 417 and 422 are stabilized by means of conventionally journaled bearing boxes 418. Shaft 424, which forms one component of linkage assembly 422, is connected to a longitudinal thrust mechanism 423 which functions, when handle 425 is raised or lowered, to withdraw butt plate 421 from or insert butt plate 421 into, engaging relationship with stretching cylinder 420. The separating cylinder 420 is carried by suitable cylindrical shoulders 426 on butt plates 417 and 421. It will be seen that by raising handle 425 butt plate 421 will be withdrawn from engaging relationship with stretching cylinder 420. The cylinder may be removed or replaced by executing and reversing this operation.

A stretcher assembly carriage 430 having generally triangular carrier arms 431 is pivotably mounted at 432 to bearing blocks 433 on frame 402. The stretcher assembly carriage is positioned such that it may swing into and out of longitudinally parallel proximity to stretching cylinder 420 as seen in FIGS. 9 and 13. A stabilization and lift conduit 434, rigidly affixed to triangular carrier arms 430 and 431, serves to maintain the arms in fixed radial relationship to each other. Triangular arms 430 and 431 also have a pair of guide rods 435 and 436 rigidly affixed therebetween as viewed in FIGS. 9 and 13.

A hydraulic cylinder 440 having an air or fluid inlet 441 is pivotably mounted to the frame at 442 and to the stabilization and lift conduit 434 at 443. As the cylinder is expanded its piston forces stretcher assembly carriage 430 upward and away from stretching cylinder 420.

The stretching gear assembly 450 has a stretching carriage 451 which is slidably mounted on guide rods 435 and 436 by means of suitably jounaled receiving sleeves 452 and 453 respectively. Pivotably mounted about axis 467 on carriage 451 are a pair of foot-shaped spreading gear carriers 454 and 455. Rotatably mounted on the foot-shaped carries are a pair of spreader gears 456 and 457 having teeth 471 adapted to engage the outside diameter straps of the ring stock to be spread. An indexing gear 458, engaging mating gear surfaces 459 and 460 on the hubs of spreader gears 456 and 457 respectively, is also rotatably journaled on axis 467. The spacing of the three cylindrical indexing gear surfaces is such that foot-shaped gear carriers 454 and 455 and the spreader gears supported thereby may all be rotated with respect to one another without destroying the mating relationship of the various indexing surfaces which serves to maintain spreader gears 456 and 457 in fixed radial relationship to each other. That is to say, that the indexing system rotatably serves the two spreader gears to insure that they always rotate either at the same circumferential speed or at fixed relative circumferential speeds.

Rigidly affixed to foot-shaped gear carriers 454 and 455 are a pair of extension levers 461 and 462 respectively. The upper extremities of extension levers 461 and 462 are slidably connected by an eye bolt 463 which has a cam 464 eccentrically mounted to the "eye" extremity thereof. A cam lever 465 is rigidly affixed to cam 464 such that the latter may be rotated by moving the cam lever 465 up and down.

As will be seen by reference to diagrammatical FIGS. 10 and 11, when cam lever 465 is pulled toward its downward position, extension levers 461 and 462 are forced toward each other. This movement, in turn, forces the spreading gear carrying portions of the foot-shaped gear carriers apart and thus increases the circumferential separation of the points on spreading cylinder 420 which are contacted by spreading gears 456 and 457. When cam lever 465 is raised, extension levers 461 and 462 separate, allowing the spreading gear carrying portions of the foot-shaped gear carriers to move toward each other. This movement, of course, decreases the circumferential separation of the points on spreading cylinder 420 which are contacted by spreading gears 456 and 457.

In operation, a coil of ring stock to be spread or stretched is helically disposed about spreading cylinder 420 in such a manner that adjacent coils lie in abutting relationship. The "up thread" or beginning end of the piston ring stock coil must be pinned to the cylinder at this time. A pin inserted through the ring stock and into a receiving aperture in the cylinder is sufficient for this purpose. The cylinder is then placed between butt plates 417 and 421 and handle 425 is moved downwardly to secure it in the position shown in the figures. Next, the separating gear carriage is moved to the "up thread" end of the separating cylinder and the air or fluid is expelled from hydraulic lifter 440 allowing carriage 430 to move in a counter-clockwise direction as viewed in FIG. 13 until such point as the teeth 471 of spreading gears 456 and 457 engage the outside diameter of the ring stock disposed about cylinder 420. Preferably, the teeth 471 are of sufficient length to pass completely through the ring stock and abut cylinder 420, thus preventing load distortion of the ring stock.

Cam lever 465 is then moved downwardly. As previously noted, such movement causes an increase in the circumferential distance between the points at which spreading gears 456 and 457 contact the spreading cylinder and the ring stock disposed thereon. Since spreader gears 456 and 457 are rotatably interconnected by indexing gear 458, this increase in circumferential separation distance causes a like increase in that section of the ring stock between the spreader gears 456 and 457. Once the desired stretch has been achieved expand limit 456 and retract limit 466 are tightened to rigidly fix the separation of the extension levers 461 and 462, and thus rigidly fix the circumferential position of spreading gears 456 and 457 with respect to cylinder 420.

Motor 411 is then activated and cylinder 420 begins to rotate at a fixed speed. Since the distance between the straps of the ring stock is constant, and since spreading gears 456 and 457 must rotate at the same or fixed relative speeds, the ring stock will be successively and uniformly stretched or spread as it passes between spreading gears 456 and 457. The spreading gear carriage will be moved longitudinally along guide rods 435 and 436 by the tendency of the spreading gears to follow the helical path of the ring stock disposed on cylinder 420.

Preferably, a weight and pulley system indicated generally at 480 is provided. One end of the cable is affixed to the stretching gear assembly 450 and the other end has means whereby free-hanging weights may be affixed thereto. The counterweight system allows variation in the tightness or looseness of the coil by varying the amount of weight attached thereto, and thus, the rate at which stretching gear assembly 450 transverse the length of the cylinder. It additionally prevents any tendency of the guide rods to bind in their respective receiving sleeves.

It will be obvious to those skilled in the art that the accuracy and success of the stretching operation requires that separating gears 456 and 457 be retained in abutting and engaging relationship to the ring stock disposed on cylinder 420. Ordinarily, the weight of the stretcher assembly carriage 430 is sufficient for this purpose. It will be obvious, however, that many other types of devices can be utilized to insure this positioning. For example, hydraulic cylinder 440 may be of the two-way type and a stop provided to prevent the spreading gear teeth from severely scoring the surface of the spreading cylinder 420.

When the spreading gear carriage has traversed the entire length of cylinder 420, and thus stretched all of the ring stock disposed thereon, the motor is deactivated. Conveniently, this deactivation may be accomplished by means of a limit switch. The "down thread" end of the ring stock is then secured to the cylinder 420, handle 425 raised, and cylinder 420 removed from the apparatus. The cylinder, with the ring stock tightly disposed thereabout, is then heat treated to set the stretch in the stock. For carbon steel rings 30–60 minutes at 600° F. is generally satisfactory for this purpose. A new cylinder may then be affixed to the apparatus and the process repeated.

While several preferred embodiments of this invention have been described together with minor modifications, it will be recognized that other modifications may be made without departing from the scope and spirit of the invention. Such modifications are to be deemed as included within the scope of the following claims unless these claims, by their language, expressly state otherwise.

We claim:

1. A method of stretching coiled hardened piston ring stock which has been selectively ruptured to create individual segments having the steps of:
   disposing the hardened coiled stock to be stretched about a receiver under radial tension such that the segment gaps are widened and thereafter;
   placing the receiver with the coil disposed therearound in raised-temperature heat treat at a sufficient temperature and for a sufficient length of time to permit stress relief and, thus, set the desired segment gap.

2. A method of stretching coiled piston ring stock which has been selectively ruptured to create individual segments having the steps of:
   disposing said coiled stock in helical fashion about a cylindrical receiver under sufficient radial tension to stretch the stock to the desired segment gaps thereafter;
   subjecting the stretched coiled stock to a sufficiently increased temperature for a sufficient period of time to permit stress relief and, thus, set the stretch.

3. A method of stretching coiled piston ring stock which has been selectively ruptured to create individual segments having the steps of:
   disposing the coiled stock to be stretched about an expandable mandrel in helical fashion;
   affixing each end of the stock to said mandrel;
   expanding the diameter of said mandrel to circumferentially stretch the coiled stock; and thereafter
   subjecting the stretched stock to an increased temperature for a period of time sufficient to set the stretch.

4. A method of stretching hardened coiled piston ring stock which has been selectively ruptured to create individual segments having the steps of:
   disposing said stock in helical fashion about a generally cylindrical receiver;
   positioning a pair of rotatably servoed spreading gears in engaging relationship with said stock adjacent the circumference of said receiver;
   stretching said stock between said gears to lengthen that circumferential portion of it disposed between said gears;
   driving said coiled stock past said spreading gears to sequentially stretch the sections thereof as they pass between said gears; and thereafter
   subjecting the stock to raised-temperature heat treatment to permit stress relief and, thus, set the desired segment gap.

5. A method of stretching coiled piston ring stock having a given inside diameter which has been selectively ruptured to create individual segments, said method having the steps of:
   increasing said given inside diameter a sufficient distance to create a segment gap of the desired width at the inside ring diameter;
   subjecting the coiled stock with its increased diameter to raised-temperature heat treatment to set the desired segment gap at the inside ring diameter;
   decreasing said given inside diameter a sufficient distance to create a segment gap of the desired width at the outside ring diameter; and
   subjecting the coiled stock with its decreased diameter to raised-temperature heat treatment to set the desired segment gap at the outside ring diameter.

6. A method of stretching coiled piston ring stock having a given inside diameter which has been selectively ruptured to create individual segments having the steps of:
   disposing the coiled stock about a first cylinder, said first cylinder having a larger outside diameter than said given inside diameter of the stock;
   heat treating the coiled stock while it is disposed about said first cylinder to relieve the stress therein and, thus, set the desired segment gap along the inside ring diameter;
   disposing the coiled stock about a second cylinder, said second cylinder having a smaller outside diameter than said given inside diameter of the stock; and
   heat treating the coil while it is disposed about said second cylinder to relieve the stress therein and, thus, set the desired segment gap along the outside ring diameter.

7. A method of stretching coiled piston ring stock having a given inside diameter and a given outside diameter which has been selectively ruptured to create individual segments having the steps of:
- disposing the coiled stock about a first cylinder, said first cylinder having a larger outside diameter than said given inside diameter of the stock;
- heat treating the coil while it is disposed about said first cylinder to relieve the stress therein and, thus, set the desired segment gap along the inside ring diameter;
- disposing the coiled stock within a second cylinder, said second cylinder having an inside diameter which is smaller that said given outside diameter of the stock; and
- heat treating the coil while it is disposed about said second cylinder to relieve the stress therein and, thus, set the desired segment gap along the outside ring diameter.

8. A method of stretching coiled piston ring stock having a given inside diameter which has been selectively ruptured to create individual segments, said method having the steps of:
- increasing said given diameter a sufficient distance to create segment gaps of the desired width at the inside ring diameter;
- subjecting the coiled stock with its increased diameter to raised-temperature heat treatment to set the desired segment gap at the inside ring diameter;
- decreasing said given diameter a sufficient distance to create segment gaps of the desired width at the outside ring diameter; and
- subjecting the coiled stock with its decreased diameter to raised-temperature heat treatment to set the desired segment gap at the outside ring diameter.

9. A method of stretching hardened coiled piston ring stock which has been selectively ruptured to create individual segments having the steps of:
- disposing said hardened coiled stock in helical fashion about a cylindrical receiving sleeve;
- affixing one end of said stock to said sleeve;
- positioning a pair of slidably mounted, rotatably servoed spreading gears in engaging relationship with said stock adjacent said sleeve;
- increasing the distance between the axes of said spreading gears while retaining them in engagement with said stock;
- rotating said receiving sleeve until a major portion of said stock has passed between said sleeve and said spreading gears;
- affixing the other end of said stock to said sleeve; and
- subjecting the sleeve with the stock disposed thereon to raised-temperature heat treatment to relieve the stress therein and, thus, set the desired segment gap.

References Cited

UNITED STATES PATENTS

| | | | |
|---|---|---|---|
| 1,215,775 | 2/1917 | Campbell | 29—156.6 |
| 1,450,346 | 4/1923 | Anderson | 29—156.6 |
| 2,742,279 | 4/1956 | Small | 266—2.5 |
| 3,241,219 | 3/1966 | Hamm | 29—156.62 |

THOMAS H. EAGER, *Primary Examiner.*